(12) United States Patent
Preston

(10) Patent No.: US 8,197,792 B2
(45) Date of Patent: Jun. 12, 2012

(54) REDUCED GENERATION OF AMMONIA IN NICKEL CATALYST OF REFORMER

(75) Inventor: John L. Preston, Hebron, CT (US)

(73) Assignee: UTC Power Corporation, South Windsor, CT (US)

( * ) Notice: Subject to any disclaimer, the term of this patent is extended or adjusted under 35 U.S.C. 154(b) by 20 days.

(21) Appl. No.: 12/734,089

(22) PCT Filed: Oct. 25, 2007

(86) PCT No.: PCT/US2007/022589
§ 371 (c)(1),
(2), (4) Date: Apr. 9, 2010

(87) PCT Pub. No.: WO2009/054830
PCT Pub. Date: Apr. 30, 2009

(65) Prior Publication Data
US 2010/0209337 A1    Aug. 19, 2010

(51) Int. Cl.
*C01B 3/02*    (2006.01)
*C01B 3/12*    (2006.01)

(52) U.S. Cl. .................... 423/648.1; 423/651
(58) Field of Classification Search ............. 423/648.1
See application file for complete search history.

(56) References Cited

U.S. PATENT DOCUMENTS

| 7,585,810 B2 * | 9/2009 | Chen et al. ............ 502/326 |
| 2009/0026419 A1 * | 1/2009 | Xu .......................... 252/373 |

* cited by examiner

*Primary Examiner* — Melvin C Mayes
*Assistant Examiner* — Kenneth Vaden
(74) *Attorney, Agent, or Firm* — M. P. Williams

(57) ABSTRACT

Reformation of natural gas without excessive production of ammonia, even if the natural gas includes as much as 14% nitrogen, is achieved in reformers including tubes (75) having outer chambers (78) with catalysts therein, a first stage (80) of catalyst having between about 10% and about 25% nickel, a second stage (81) of catalyst having less than 10% nickel, and a final stage (82) having 2% or less rhodium catalyst of a low concentration.

2 Claims, 3 Drawing Sheets

US 8,197,792 B2

REDUCED GENERATION OF AMMONIA IN NICKEL CATALYST OF REFORMER

TECHNICAL FIELD

A reformer producing hydrogen-containing reformate gas, such as for use in a fuel cell power plant, from natural gas feedstock having high nitrogen content, produces only small amounts of ammonia due to gradations of nickel content of catalyst bed as a function of position in the catalyst bed and therefore of temperature of the reaction.

BACKGROUND ART

Natural gas feedstocks from various parts of the world have differing nitrogen content. Reforming natural gas to provide hydrogen-rich reformate gas for use, for instance, in a fuel cell power plant must be done with relative efficiency. A relatively inexpensive and effective catalyst for converting the hydrocarbons in natural gas to a hydrogen-rich reformate gas is nickel. However, the nickel catalysts promote an undesirable side reaction, combining product hydrogen with nitrogen present in the natural gas, to form ammonia: $0.5 N_2 + 1.5 H_2 = NH_3$. The ammonia reacts with both phosphoric acid fuel cells and proton exchange membrane fuel cells to cause significant decay in fuel cell performance. The problem is sufficiently serious to require the use of ammonia scrubbers between the reformer and the fuel cell power plant, in some cases.

While rhodium will promote production of hydrogen-rich reformate without producing any ammonia, the cost of rhodium is excessive, being many thousands of US dollars per ounce at this writing.

SUMMARY

It is now recognized that the rate of production of ammonia from hydrogen and nitrogen in the presence of a nickel catalyst increases significantly with temperature, being only nominal at lower reformer temperatures, such as on the order of 700° F. (370° C.) and becoming extensive at temperatures of 1000° F. (540° C.)-1300° F. (700° C.). It is now also appreciated that the rate of ammonia production is directly affected by the nickel surface area in the catalyst bed, which is typically formed of nickel dispensed on a bed of alumina pellets: catalyst beds of less than 10% nickel, even at the higher temperatures referred to above, do not produce a prohibitive amount of ammonia, whereas nickel catalyst beds having between 10% and 25% nickel do not produce prohibitive amounts of ammonia below about 800° F. (430° C.).

Portions of the reformer near the inlet, where the temperature is relatively low, have a higher nickel content, and portions of the reformer which are at greater distances from the inlet, and therefore at higher temperatures, have catalysts with a lower nickel content. Furthermore, to extract maximal hydrogen with minimal ammonia being produced, a small amount of rhodium may be used near the outlet of the reformer. In one example, a reformer is divided into three portions, an inlet portion having nickel catalyst of between about 10% nickel and about 25% nickel, a middle portion having nickel catalyst with a nickel content below about 10%, and an outlet portion having a relatively low content of rhodium. The arrangement may be modified by having additional portions, thereby establishing smaller gradations of nickel content in successive portions of a reformer extending from the inlet thereof.

Other variations will become more apparent in the light of the following detailed description of exemplary embodiments, as illustrated in the accompanying drawings.

MODE(S) OF IMPLEMENTATION

Figure 1:
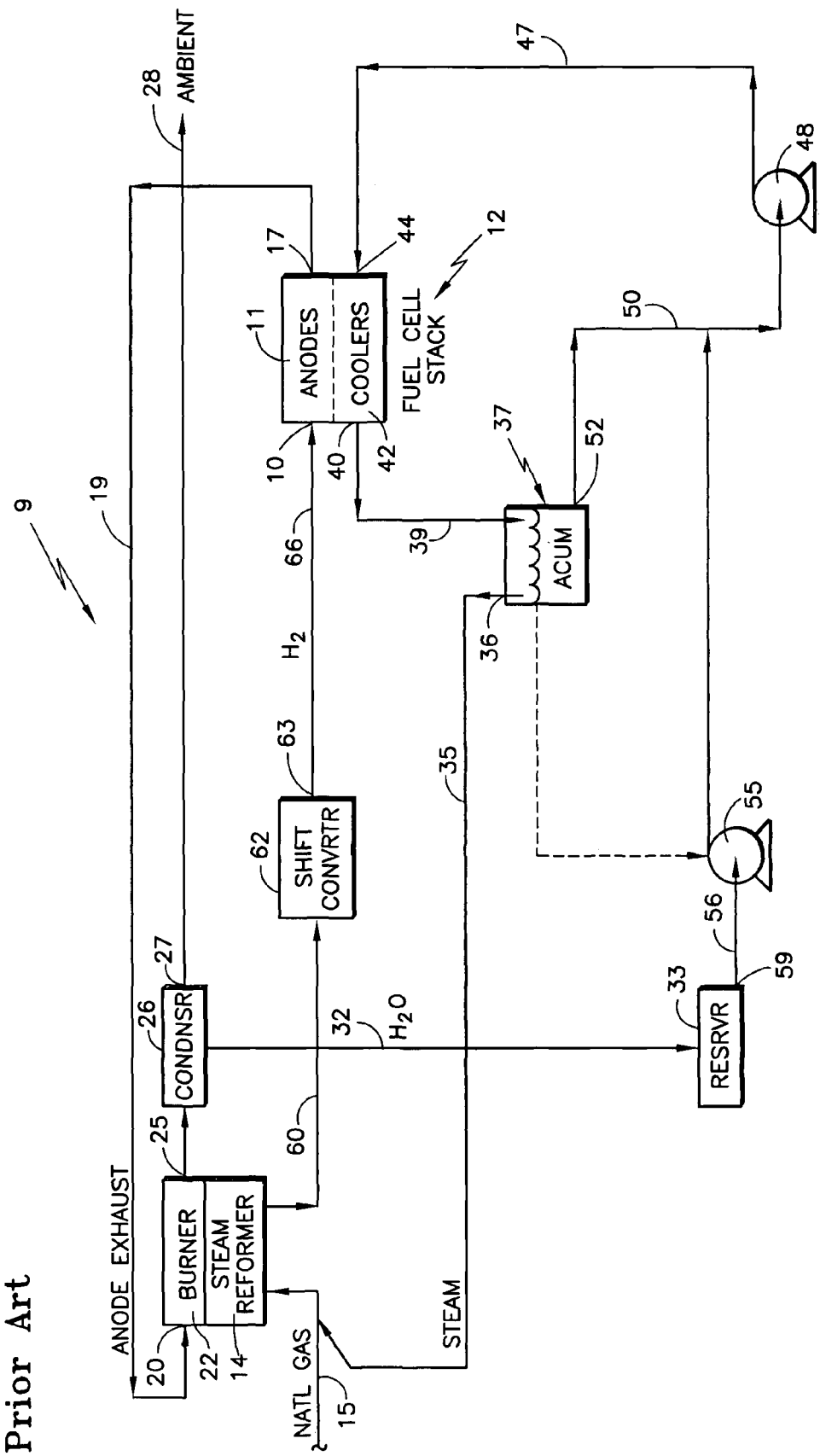
FIG. 1 is a simplified, exemplary block diagram of a system employing a reformer to provide hydrogen to a fuel cell power plant in which natural gas feedstocks with a high nitrogen content can be reformed without excessive ammonia production.

In FIG. 1, an exemplary system 9 for providing hydrogen to the inlet 10 of the anodes 11 of a fuel cell stack 12, includes a steam reformer 14 which does not generate excessive ammonia, although it utilizes nickel catalysts and may reform natural gas 15 having a high nitrogen content.

The exit 17 of the fuel cell anodes is connected by a suitable conduit 19 to the inlet 20 of a burner 22 that provides heat to the steam reformer 14. The outlet 25 of the burner 22 is connected to a condenser 26 which cools the burner exhaust (typically by an ancillary coolant liquid which is cooled in turn by means of a fan using ambient air) to condense moisture out of the exhaust, the dried gas at the exit 27 of the condenser being released to ambient 28. The water condensed from the burner exhaust is provided in a conduit 32 to a reservoir 33.

Steam for the steam reformer 14 is provided on a conduit 35 from the steam outlet 36 of a separator/accumulator 37, which may comprise a flash drum. The inlet to the accumulator 37 is a two-phase, hot coolant in a conduit 39 from the outlet 40 of the coolers 42 in the fuel cell stack 12. The inlet 44 to the coolers is connected to a conduit 47 to a coolant pump 48 which is connected by a conduit 50 to a liquid outlet 52 of the accumulator 37. The level of liquid in the accumulator 37 is monitored to control a condensate pump 55 which is connected to a conduit 56 to an outlet 59 of the condensate reservoir 33. Whenever the liquid level in the accumulator 37 is too low, the pump 55 will be operated so as to add condensate into the flow of coolant in the conduit 50, at the inlet to the pump 48.

The reformate generated in the reformer 14 is provided in a conduit 60 to a shift converter 62 so as to provide reformate with increased hydrogen content at its exit 63. The hydrogen-rich reformate is applied by a conduit 66 to the inlet 10 of the anodes 11 in the fuel cell stack 12.

The steam reformer 14 may typically comprise some number (such as between 15 and 40) of thin vertical tubes having the catalyst beds therein. In one form, the feed is applied to the catalyst beds at the bottom of the tubes, the flow being upwardly through the catalyst bed, and then the flow of reformate being returned in an adjacent, coaxial chamber that allows regeneration of the heat released in the process so as to provide heat to promote the process as well.

Figure 2:
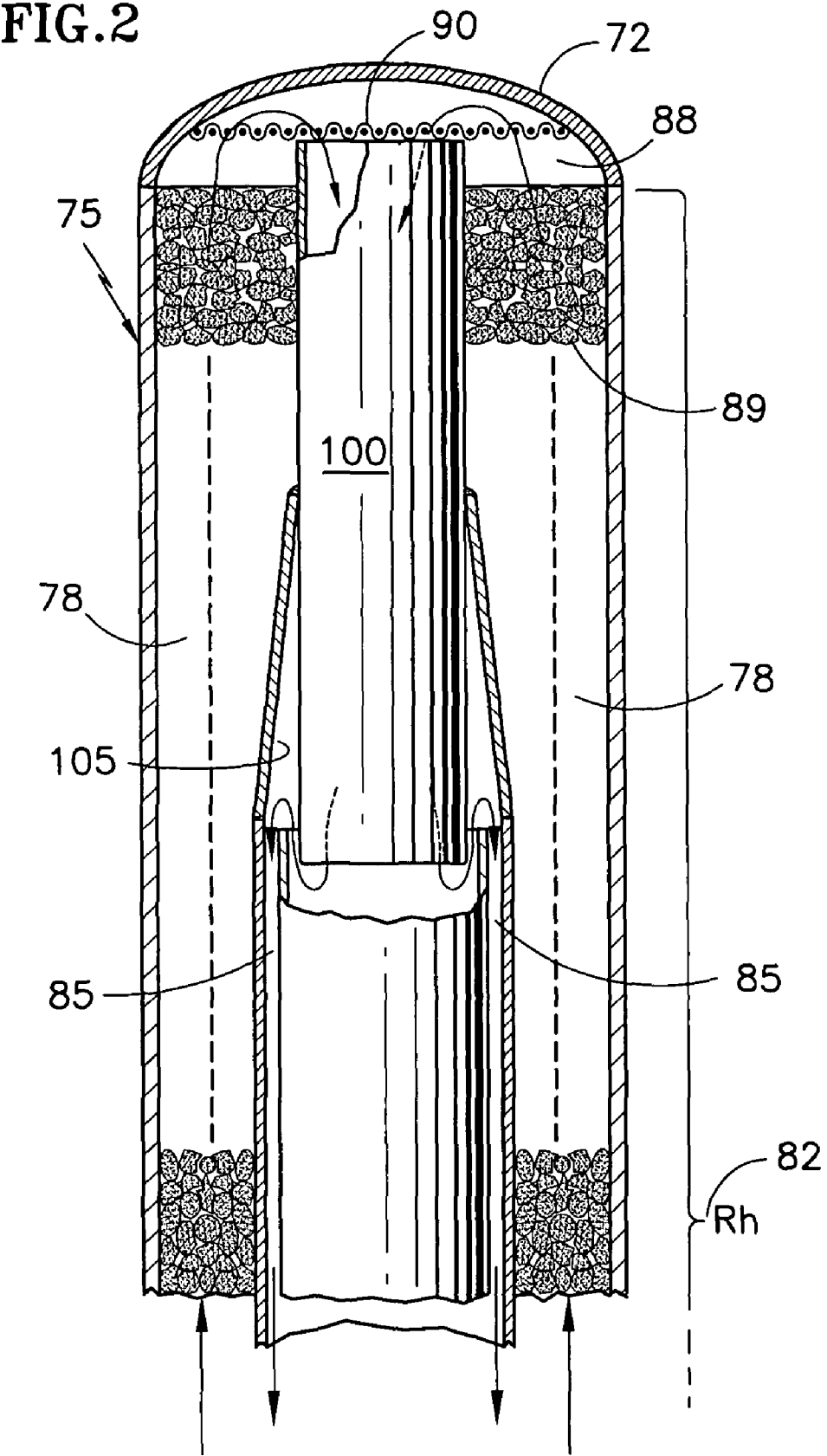
FIG. 2 is a partial section of an exemplary tube, a plurality of which may be used in the reformer of FIG. 1.

In FIG. 2, the top end 72 of one such tube 75, shown more simply in FIG. 3, closes off an outer reaction chamber 78 which is layered with catalysts: nickel, with a concentration of between about 10% and about 25% in a first stage 80; nickel, with a concentration of below about 10% in a second stage 81; and rhodium, in as low a concentration as will provide the desired result (typically about 2% or less), in a third stage 82.

The tube 75 also has a cylindrical inner, reformate return chamber 85, coaxial with the first, catalyst chamber 78. The upper end of the tube 75 is configured to permit passage of reformate gas upwardly through a space 88 above the rhodium catalyst 89, through a screen or wire mesh 90, downwardly through a transition tube 100 and then upward into a frustoconical chamber 105 and thence down, into the chamber 85.

At higher temperatures, the reformer reaction takes place very quickly as the feed stock flows over the external surfaces of the catalycized, semi-porous, alumina pellets. Any catalyst disposed on the inner surfaces (e.g., surfaces of pores) will be a waste of catalyst, and therefore a waste of money. In the case of nickel catalysts, reforming natural gas containing nitrogen, the presence of catalysts on the internal surfaces will also increase the undesired production of ammonia while not producing the desired reformate. In the case of noble metal catalysts, such as rhodium, the presence of catalysts on the inner surfaces of the pellets is simply a waste of money. Therefore, pellets with catalysts disposed only the outer surfaces of the pellets should be utilized when possible. Such catalycized pellets are available in the market from Johnson Matthey, made by a proprietary process unknown to applicant.

Once operation has stabilized, the temperature at the inlet may be between 600° F. (315° C.) to 700° F. (370° C.), the temperature half way up the tube may be on the order of 900° F. (480° C.) and the temperature as the gas exits the catalyst in the space 88 may be between about 1200° F. (650° C.) and about 1300° F. (700° C.).

Figure 3:
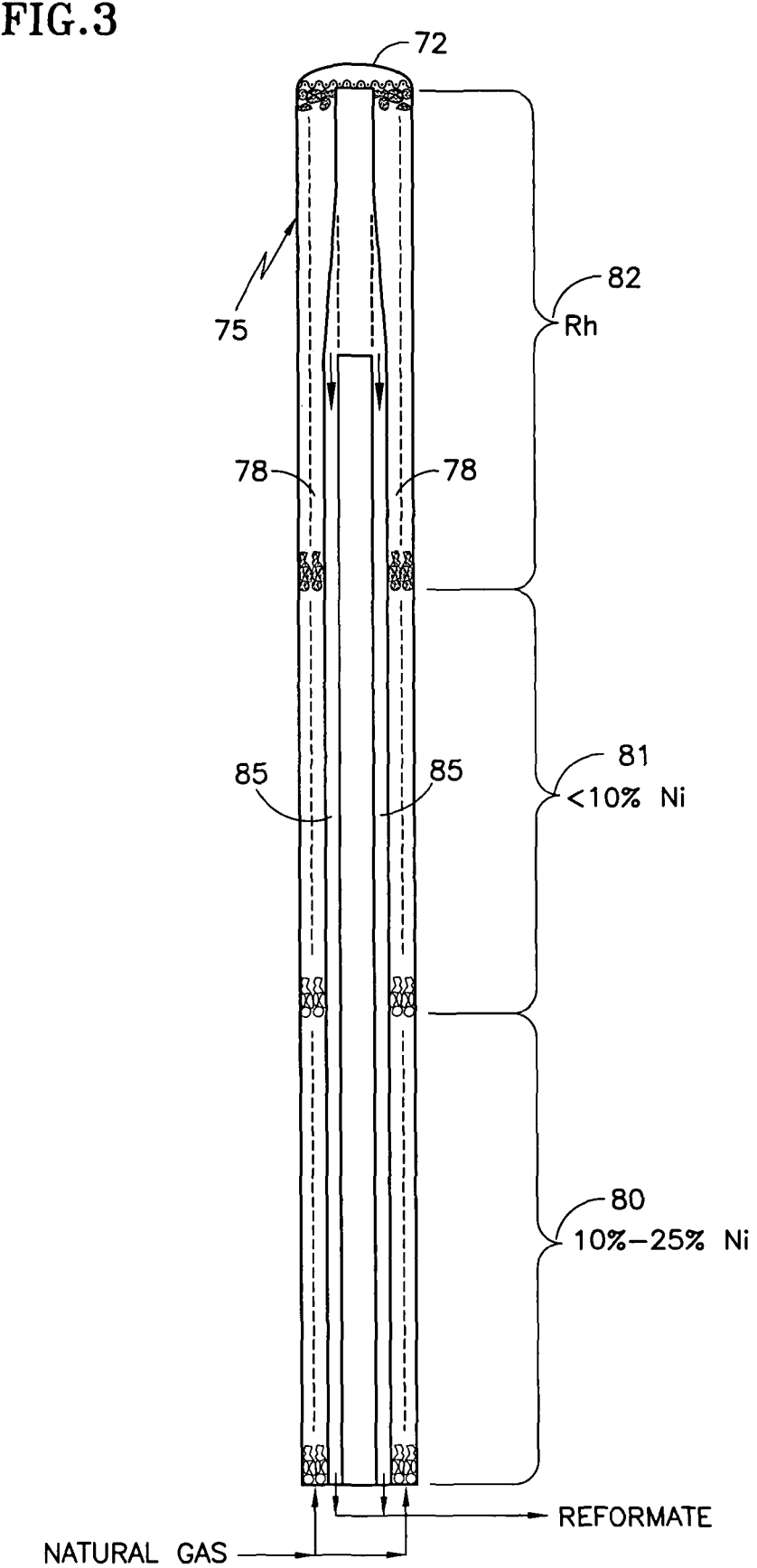
FIG. 3 is a simplified line drawing of the tube of FIG. 2, illustrating an exemplary embodiment of a nickel catalyst reformer which produces only low amounts of ammonia.

In FIGS. 2 and 3, an exemplary steam reformer tube is shown with three stages, all of about the same length. However, variations may be made in the arrangement, which in the general case is the provision of reduced nitrogen content along the flow of the feed stock. This equates to having a lower nickel content as a function of increasing temperature, which in the example given is not incremental, but achieved in a step function manner since there are only two stages of nickel catalysts. Two or more stages of nickel catalyst may be used with or without the stage of rhodium catalyst.

The invention claimed is:

1. A method of reforming natural gas characterized by flowing natural gas from an inlet through a catalyst bed having a nickel content which decreases in discreet stages with distance from said inlet, a first stage having a nickel content of between about 10 wt. % and about 25 wt. % and a second stage having a nickel content of more than zero wt. % but less than about 10 wt. %, and further characterized by flowing natural gas through a third stage containing rhodium.

2. A natural gas reformer having an inlet characterized by a catalyst bed having a nickel content which decreases in discreet stages with distance from said inlet, the nickel content of a first stage is between about 10 wt. % and about 25 wt. %, and the nickel content of a second stage is more than zero wt. % but less than about 10 wt. %, and further characterized by a third stage containing rhodium.

* * * * *